United States Patent
Fink

(10) Patent No.: US 8,659,411 B2
(45) Date of Patent: Feb. 25, 2014

(54) METHOD, SENSOR, DETECTOR AND SYSTEM FOR LOCATING AT LEAST ONE WHEEL ON A VEHICLE

(75) Inventor: Alexander Fink, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 360 days.

(21) Appl. No.: 13/054,587

(22) PCT Filed: Sep. 22, 2009

(86) PCT No.: PCT/EP2009/062245
§ 371 (c)(1),
(2), (4) Date: Feb. 24, 2011

(87) PCT Pub. No.: WO2010/034703
PCT Pub. Date: Apr. 1, 2010

(65) Prior Publication Data
US 2011/0169627 A1    Jul. 14, 2011

(30) Foreign Application Priority Data
Sep. 26, 2008 (DE) .......... 10 2008 049 046

(51) Int. Cl.
*B60C 23/00* (2006.01)
(52) U.S. Cl.
USPC ........... 340/442; 340/444; 340/445; 340/447; 701/34.4; 701/36
(58) Field of Classification Search
USPC .................... 340/442; 701/34.4, 36, 146.2
See application file for complete search history.

(56) References Cited

U.S. PATENT DOCUMENTS

| | | | |
|---|---|---|---|
| 5,602,524 A | 2/1997 | Mock et al. | |
| 6,917,287 B2 | 7/2005 | Boulot | |
| 7,227,458 B2 | 6/2007 | Watabe et al. | |
| 7,268,678 B2 | 9/2007 | Chakam et al. | |
| 7,336,161 B2 | 2/2008 | Walraet | |
| 7,451,024 B2 | 11/2008 | Brusarosco et al. | |
| 8,096,172 B2 * | 1/2012 | Gotschlich | ............ 73/146 |
| 2006/0087420 A1 | 4/2006 | Walraet | |
| 2009/0049903 A1 | 2/2009 | Murakami et al. | |

FOREIGN PATENT DOCUMENTS

| | | |
|---|---|---|
| DE | 198 49 390 A1 | 5/2000 |
| DE | 19926616 C2 | 5/2001 |
| DE | 10212644 B4 | 11/2004 |
| DE | 103 42 297 A1 | 4/2005 |
| DE | 102004034875 A1 | 3/2006 |
| EP | 0 626 911 B1 | 11/1995 |
| JP | 2004359120 A | 12/2004 |
| JP | 2005523192 A | 8/2005 |
| JP | 2005321958 A | 11/2005 |
| JP | 2007091183 A | 4/2007 |

* cited by examiner

*Primary Examiner* — Daryl Pope
(74) *Attorney, Agent, or Firm* — Laurence A. Greenberg; Werner H. Stemer; Ralph E. Locher

(57) ABSTRACT

A method, a sensor, a detector and a system are provided for locating at least one wheel on a vehicle. A signal is received from a first sensor mounted on the wheel, the signal providing a position of the wheel. Additionally, a measurement value is received from a second sensor that measures the angular position of a wheel and that is associated with a specific position of the vehicle. When the phase position of the first signal stays within a predefined tolerance range relative to the measured value within a specific observation period, the first sensor can be associated with the second sensor.

14 Claims, 2 Drawing Sheets

METHOD, SENSOR, DETECTOR AND SYSTEM FOR LOCATING AT LEAST ONE WHEEL ON A VEHICLE

BACKGROUND OF THE INVENTION

Field of the Invention

The invention relates to a method for locating at least one wheel on a vehicle. In addition, the invention relates to a sensor which is provided for mounting on a wheel or a tire mounted on the wheel, and to a detector for locating at least one wheel on a vehicle. Finally, the invention relates to a system for locating at least one wheel on a vehicle.

Modern vehicles frequently have tire pressure control systems or tire information systems in which sensors installed in the tire send measured values for various measured variables (for example tire pressure, tire temperature, wheel load, etc.) to a reception unit. In this case, the sensors have an associated explicit serial number which is also sent with a measured value transmission, so that the receiver can explicitly associate the measured values with a tire on the basis of this serial number. This is described in EP 626 911 B1, for example.

However, the serial number alone does not yet allow a particular installation position on the vehicle to be inferred, which is why many vehicles are also equipped with a system for wheel location. The task of location is to assign each serial number an installation position. This subsequently allows measured values to be associated with a particular position on the vehicle and allows the driver to be informed as appropriate if a tire (pressure) problem occurs, for example using a warning "pressure drop front left". Furthermore, automatic wheel location allows the correct mounting of the tires/the wheels on a vehicle to be checked, and a warning to be sent to the driver in the event of an error. In this context, both mounting on the correct axle and mounting on the correct side are considered. Examples of circumstances which can trigger a warning are mounting of the frequently wider rear tires on the front axle and mounting in the wrong direction of rotation.

There are a series of approaches to wheel location. One possibility for checking the correct mounting of the tires/the wheels is for the direction of rotation of a tire/a wheel to be evaluated and for the direction of rotation to be used to infer the place at which the tire/the wheel is mounted.

Frequently, this task is performed using the aforementioned direct tire pressure systems, that is to say systems in which a sensor is installed directly in the rotating tire. These sensors usually transmit their data by radio to a reception unit mounted in the vehicle. By measuring the reception field strength, it is possible to infer the position of the wheel, cf. DE 103 42 297 A1. However, this is also dependent on the transmission power of the sensor, which in turn is dependent on the strength of a battery in the sensor. The mounting site for a central reception unit also often cannot be chosen arbitrarily, which means that in some cases only ambiguous signals are available. As an alternative, each wheel can be assigned a separate reception unit, but this is technically very complex.

BRIEF SUMMARY OF THE INVENTION

The object on which the present invention is based is thus to specify a method, a sensor, a detector and a system which allow the wheels of a vehicle to be located in a simple manner.

The invention achieves this object by means of a method having the features as claimed and/or by means of a sensor having the features as claimed and/or by means of a detector having the features as claimed and/or by means of a system having the features as claimed.

Accordingly, provision is made for a method for locating at least one wheel on a vehicle to involve the following steps being performed:

a) a signal is received from a first sensor mounted on the wheel, which signal indicates a position for the wheel;
b) a measured value is received, from a second sensor, which measures the angular position of a wheel and is associated with a particular location on the vehicle;
c) the phase angle of the first signal is determined in relation to the measured value;
d) the first sensor is associated with the second sensor if the phase angle remains within a prescribed tolerance range in a particular observation period.

Accordingly, a sensor is also provided which is provided for mounting on a wheel or on a tire mounted on the wheel, for transmitting a signal which indicates a position for the wheel, and for measuring a further parameter for the wheel or the tire.

In addition, the object according to the invention is achieved by providing a detector for locating at least one wheel on a vehicle, comprising:

a) means for receiving a signal from a first sensor which is mounted on the wheel, which signal indicates a position for the wheel;
b) means for receiving a measured value from a second sensor, which measures the angular position of a wheel and is associated with a particular location on the vehicle,
c) means for determining the phase angle of the first signal in relation to the measured value;
d) means for associating the first sensor with the second sensor if the phase angle remains within a prescribed tolerance range in a particular observation period.

Finally, in line with the object according to the invention, a system for locating at least one wheel on a vehicle is also provided which comprises a detector according to the invention, first sensors according to the invention which are provided for communication with the detector, and second sensors which are provided for communication with the detector.

At this juncture, it is pointed out that the invention also relates to the location of tires as such, that is to say that claim 1 can also be read as a "method for locating at least one tire on a vehicle". The term "wheel" could then also be notionally replaced by "tire" in the remaining part of the application.

The advantage of the invention is, inter alia, that a wheel can be located with comparatively little technical complexity. Any second sensors which are present, as are required anyway for ABS systems (antilock braking systems) and ESP systems (electronic stability program), can advantageously also be used for the invention. A further advantage of the invention is also that it is comparatively error-tolerant and even works in the event of sporadic failures in the radio transmission link.

Advantageous refinements and developments of the invention can be found in the subclaims and in the description in combination with the figures of the drawing.

It is advantageous if the first sensor transmits the signal in a prescribable position of the wheel. In this case, it is not necessary for a measured value for an angular position of a wheel to be transmitted from the sensor to the detector, but rather a pulsed signal when a prescribed position of the wheel is reached is sufficient in principle. On the one hand, the signal is less complex, and on the other hand, advantages for the execution of the method steps can also arise if a fixed angle for the wheel can be assumed. Naturally, it is also possible for other data to be transmitted when the prescribed position is reached, for example a pressure prevailing in the tire.

It is beneficial in this context if the prescribable position provided for the wheel is one or more from the following group: angular position of the wheel relative to space, entry of a point on the wheel circumference into the wheel footprint, emergence of a point on the wheel circumference from the wheel footprint, arrival of a point on the wheel circumference at the center of the wheel footprint. These positions are simple to ascertain and are therefore well suited to the application within the context of the invention. In this case, it should be noted that the angular position upon entry and emergence from the wheel footprint varies with wheel load, tire pressure, etc. Particularly suitable for detection of the indicated prescribable wheel positions are acceleration sensors, which can measure an acceleration transversely with respect to the axis of rotation of the wheel, and piezo sensors, which can detect entry into or emergence from the wheel footprint and also migration through the latter.

It is particularly advantageous if the observation period is chosen such that the revolutions of at least two wheels have a prescribable difference. In order to be able to explicitly associate the wheels with a particular position on the vehicle, a speed difference between the wheels is advantageous. The observation period can now be determined by virtue of execution of the fourth step d) prompting a waiting period until such a difference becomes established. In this case, the observation period is thus not prescribed in a fixed manner, but rather is obtained dynamically as a result of the occurrence of the indicated condition.

It is also particularly advantageous if the observation period is determined by awaiting the occurrence of a particular operating situation for the vehicle. In addition to the evaluation of the difference in the wheel revolutions, it is also possible to await an operating situation, the occurrence of which involves the inventive method being started and/or terminated. By way of example, the start and end of cornering can be established using a transverse accelerometer. At the start of cornering, the inventive method can then be started and steps a) and c) executed repeatedly until the end of cornering is ascertained and the execution of step d) is initiated. Besides cornering, it is naturally also possible to evaluate other operating situations in which a speed difference between the wheels usually appears. Examples are heavy acceleration and braking maneuvers, which frequently involve spinning wheels. It is thus possible to use totally "normal" operating situations for a vehicle to locate the wheels, which means that the execution of the inventive method can take place in the background completely unnoticed by the driver. A measurement procedure provided specifically for that purpose, which would be started by the vehicle owners and would therefore presumably be perceived as onerous, does not therefore have to be experienced.

It is also beneficial if the further parameter measured by the first sensor is one or more from the following group: tire temperature, tire pressure or wheel load. Sensors for the indicated parameters are often found in modern vehicles anyway, which means that they merely need to be extended by the function according to the invention. In this context, advantages arise when the sensor is mounted on the tire or on the wheel, since only one sensor needs to be mounted for a plurality of functions.

Finally, it is beneficial in a measurement system according to the invention if the means for determining the angular position in which the signal from the first sensor is received and the means for associating the first sensor with the second sensor are arranged in a semiconductor chip, and the reception means are at least one input and/or a radio reception module thereof.

Semiconductor chips are small, failsafe and easily available. It is therefore beneficial to have the functions according to the invention executed in such a semiconductor chip, for example a microprocessor with a memory. However, it is also possible to integrate the method according to the invention, or the means required therefor, into onboard electronics which are present anyway.

The above refinements and developments of the invention can be combined in arbitrary fashion.

BRIEF DESCRIPTION OF THE SEVERAL VIEWS OF THE DRAWING

The present invention is explained in more detail below with reference to the exemplary embodiments indicated in the schematic figures of the drawing, in which.

DESCRIPTION OF THE INVENTION

Figure 1:
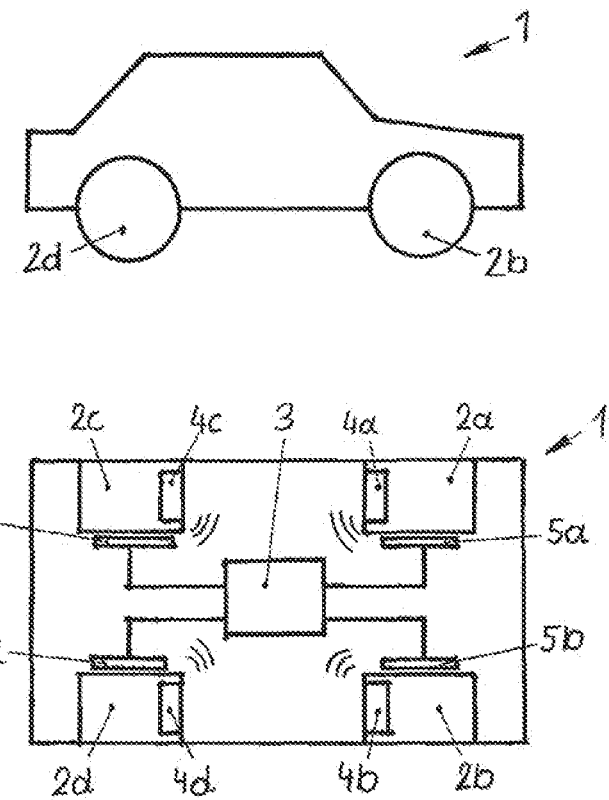
FIG. 1 shows a plan view and a side view of a vehicle having the system according to the invention.

In the figures of the drawing, elements and features which are the same and have the same function are provided with the same reference symbols—unless stated otherwise.

Figure 2:
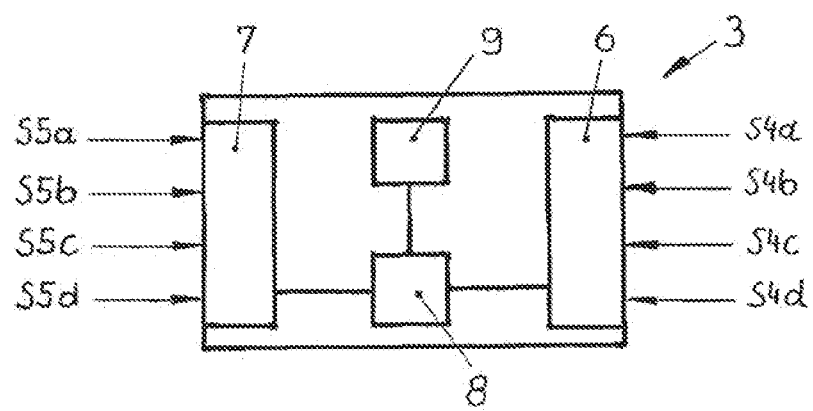
FIG. 2 shows the most important components of a detector.

FIG. 1 shows a side view and a plan view of a vehicle 1. The vehicle 1 comprises four wheels 2a . . . 2d with respective associated first sensors 4a . . . 4d, a measurement system 3 for locating at least one wheel 2a . . . 2d on the vehicle 1, and four second sensors 5a . . . 5d which are associated with a particular position on a vehicle 1. In the example shown, the second sensor 5a is arranged at the front left, the second sensor 5b is arranged at the front right, the second sensor 5c is arranged at the rear left and the second sensor 5d is arranged at the rear right. FIG. 2 shows a detailed outline of a measurement system 3. Said system comprises a receiver 6 for picking up the signals S4a . . . S4d transmitted by radio from the first sensors 4a . . . 4d and an input module 7 for picking up the signals S5a . . . S5d from the second sensors 5a . . . 5d. Furthermore, the measurement system 3 comprises a microcontroller 8 and a memory 9. The memory 9 may be provided, inter alia, for the purpose of storing the data and also sequences necessary for the method according to the invention. Usually, the method will be stored in the memory 9 in the form of a program. The microcontroller 8 reads said program and executes the method step by step. The measurement system 3 may also be part of an onboard computer (not shown) which also executes other control tasks in the vehicle 1. Optionally, the parts of the monitoring appliance can then be regarded not as physical blocks but rather as functional blocks. For the sake of simplicity, however, it is subsequently assumed that the measurement system 3 is a separate appliance.

Figure 3:
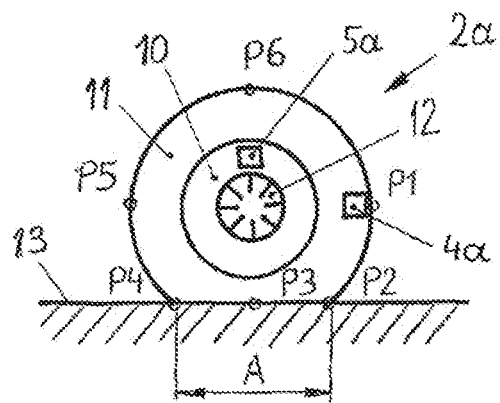
FIG. 3 shows a detail view of a wheel.

FIG. 3 shows a detail illustration of the wheel 2a. The wheel 2a, which is stationary on a road 13, comprises a rim 10, a tire 11 mounted thereon and a bar line disk 12 mounted thereon. The wheel load causes the tire 11 to deform in the region of the wheel footprint A (also known by the term "contact area") and at that point assumes the shape of the road, which is flat in the example shown.

The first sensor 4a is provided for the purpose of transmitting a signal S4a in a particular position of the wheel 2a. This may be an angular position of the wheel in relation to space, for example 3 o'clock P1, 9 o'clock P5 or 12 o'clock P6. Such positions can be ascertained comparatively easily in a manner which is known per se, for example using an acceleration sensor which is fixed on the wheel 2a, since the gravity acting on the sensor always points to the center of the earth. If—as is not absolutely necessary—the position of the wheel 2a needs to be ascertained exactly, superimposed accelerations, such as centrifugal acceleration, accelerations by the vehicle and journeys on an inclined plane, need to be taken into account. Besides the evaluation of the direction of gravity, it is naturally also possible to evaluate the direction of the longitudinal accelerations during acceleration and deceleration of the vehicle 1. The occurrence of such an operating situation can be detected either by differentiating the wheel speed or using acceleration sensors installed in the vehicle 1. By way of example, it is again possible to identify the 3 o'clock position P1, the 9 o'clock position P5 and the 12 o'clock position P6.

Per se, the 6 o'clock position P3 is likewise a position in space, but can be ascertained only with difficulty using an acceleration sensor, since only gravity acts on said acceleration sensor throughout the migration through the wheel footprint A and not just at a singular point. Position P3 is therefore processed together with the positions P2 and P4. This is because the position provided for the wheel 2a may also be the entry of a point on the wheel circumference into the wheel footprint A (P2), emergence of a point on the wheel circumference from the wheel footprint A (P4), arrival of a point on the wheel circumference at the center of the wheel footprint A (P3). For this application, a piezo sensor can be used, for example, which is not curved in the region of the wheel footprint A, is slightly curved outside of the wheel footprint A and is highly curved in a transition region. From this deformation pattern, it is possible to infer the position of the wheel 2a. Since the wheel footprint A is dependent on the wheel load and the tire pressure, inter alia, the positions P2 and P4 are not identical to a (constant) position for the wheel 2a in space.

Advantageously, the deformation energy converted into electrical energy by a piezo crystal can also be used for supplying power to the first sensor 2a. Optionally, it is then possible to dispense with a battery completely. However, it is also possible to back up an available battery or to charge a capacitor, which ensures that the power is supplied over a certain period. The changing polarity of the voltage produced by the piezos means that a rectifier additionally needs to be provided.

In the example shown, the sensor 4a . . . 4d transmits the signal S4a . . . S4d at a prescribable position P1 . . . P6 of the wheel 2a . . . 2d. Naturally, the sequence shown also works if the detector 3 requests the position P1 . . . P6 of a wheel 2a . . . 2d at a particular time, however.

The second sensor 5a is provided for the purpose of measuring an angular position for the wheel 2a. In the example shown, this is done in a manner which is known per se using a reflex or fork light barrier and a bar line disk 12. The light/dark differences are recognized by the second sensor 5a and converted into an angular position using downstream electronics. Alternatively, it is possible per se for the count pulses from the light barrier to be processed further directly as an angle equivalent. If the number of light/dark changes captured on the bar line disk 12 is high, a high angular resolution is possible, and if the number is low then only a low angular resolution is possible. Vehicle construction frequently also makes use of toothed or perforated disks, the susceptibility to soiling meaning that instead of an optical sensor it is also possible to use a Hall sensor, provided that the toothed or perforated disk is made of metal. In principle, capacitive and inductive pickups are naturally also conceivable for measuring the angular position of the wheel 2a.

The angular positions of the wheels 2a . . . 2d can be determined with little complexity by evaluating the wheel speed signals, as are needed anyway for ABS systems (antilock braking systems) and ESP (electronic stability program), for example. In this case, a segment (or else a tooth) in the wheel speed sensor is defined as a zero point at a particular time, for example when the ignition is switched on. In relation to this position, it is then possible to calculate the following angles on the basis of a count of the segments (or teeth) encountered.

Finally, it is also conceivable for the second sensor 5a to be of the same design as the first sensor 4a. One example would be an acceleration sensor fitted to the drive axle, for example. The difference between the first sensor 4a and the second sensor 5a is then particularly that the second sensor 5a is associated with a position on the vehicle 1. The second sensor 5a is associated with the front left wheelbox in this example.

Figure 4:
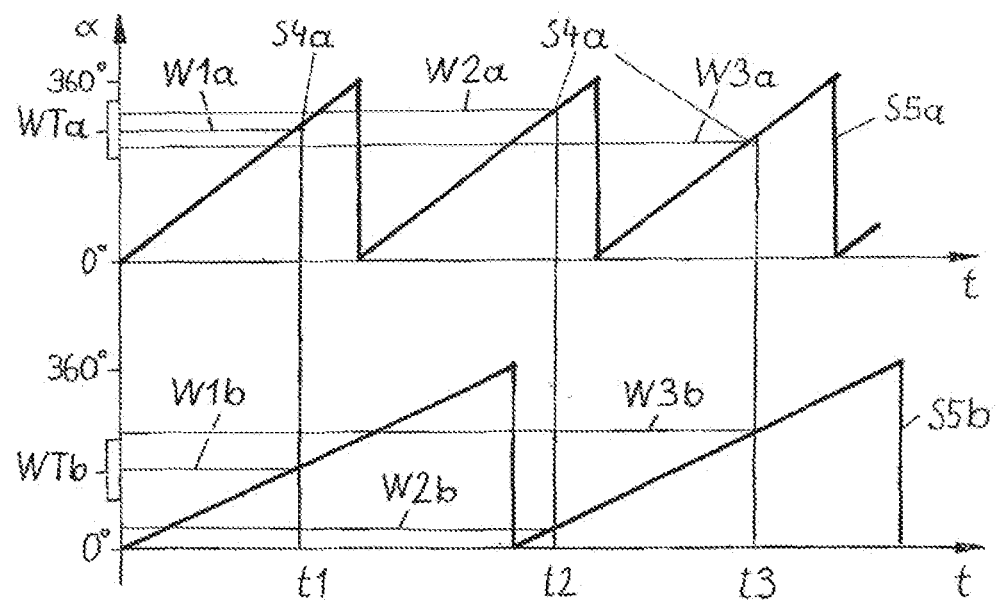
FIG. 4 shows the timings of the signals from the first and second sensors.

Finally, FIG. 4 shows a timing diagram for the first sensor 4a at the front left and two second sensors 5a (front left) and 5b (front right), the signal S5a being shown at the top and the signal S5b being shown at the bottom.

The signal S5a exhibits a sawtooth-shaped profile, with a tooth corresponding to one full revolution, that is to say an angle from 0° to 360°, of the wheel 2a. The signal S5b likewise exhibits a sawtooth-shaped profile, but at a lower frequency, which means that the wheel 2b fitted alongside the second sensor 5b is moving more slowly than the wheel 2a. The vehicle 1 is thus in a right-hand curve.

The workings of the method according to the invention, or of the measurement system 3, will now be explained in more detail with reference to FIGS. 1 to 4. Upon request or at recurrent times, the measurement system 3 starts to perform the method according to the invention:

In a first step a), the signal S4a from the first sensor 4a, mounted on the wheel 2a, is received. In the example shown, it is assumed that this occurs in the 9 o'clock position P5. In this case, the signal is transmitted by radio, but other transmission options are likewise possible in principle.

In a second step b), the signals S5a and S5b from the second sensors 5a and 5b are received. These correspond to the profile shown in FIG. 4, but step-shaped profiles can also be envisaged if the resolution of the second sensors 5a and 5b is lower.

At this juncture, it should be pointed out that particularly steps a) and b) cannot be executed in parallel in the indicated order or at all. Furthermore, the signals from all the first sensors 4a . . . 4d and from all the second sensors 5a . . . 5d can be picked up in one cycle. In the example shown, however, it is also assumed—for the sake of better clarity—that only the signals from a first sensor 4a and from two second sensors 5a and 5b are evaluated.

In a third step c), it is now determined at what phase angle W1a . . . W3a the signal S4a from the first sensor S4a is received. At a time t1, the signal S4a is received at a phase angle W1a, at a time t2 it is received at a phase angle W2a and a time t3 it is received at a phase angle W3a. The phase angles W1a . . . W3a do not remain constant, but rather are subject to a certain level of variation. By way of example, this is caused by measurement tolerances in the sensors and also what is known as "jitter", that is to say fluctuations in the measurement or measured value transmission over time.

A further reason for an angle offset in the case of otherwise constant times for measurement and measured value transmission is the speed of a wheel. Depending on the speed, a constant processing time causes a different angle offset, which can be make it difficult or even impossible to locate a wheel 2a . . . 2d. Advantageously, the whole time delay between a wheel position P1 . . . P6 being reached and the signal S4a . . . S4d being received on the detector 3 is known in the measurement system 3, which means that the cited influence can be taken into account. This can be achieved, by way of example, by providing a constant time interval between a wheel position P1 . . . P6 being reached and the signal S4a . . . S4d being received. In this case, a delay time—which is dependent on the wheel speed—between a wheel position P1 . . . P6 being reached and the signal S4a . . . S4d being transmitted is awaited, for example by electronics in the sensor 4a . . . 4d, so that the angle offset remains constant. Alternatively, it is possible to use time stamps when the system time is uniform. In this case, the wheel position P1 . . . P6 is additionally provided with a time stamp which can be evaluated by the detector 3.

A significant and above all indefinite time delay can also arise during the communication between the detector 3 and the sensors 4a . . . 4d or 5a . . . 5d by means of a communication bus (e.g. CAN bus), definite or constant transmission times not being able to be ensured in said bus. Advantageously, the measured values are provided with time stamps in this case too in order to be able to take account of the actual time delay in the detector 3.

For the aforementioned reasons, a tolerance range WTa is provided. In the example shown, the tolerance range WTa is set such that the first ascertained phase angle W1a is in the center of the tolerance range Wta. This is only an illustrative example, and other stipulations of the tolerance range are equally possible. Similarly, the phase angles W1b . . . W3b are ascertained and a tolerance range WTb stipulated.

In a fourth step d), the first sensor 4a is now associated with the second sensor 5a if the phase angle W1a . . . W3a remains within a prescribed tolerance range WTa in a particular period.

For the purpose of better understanding of this step, it will be made clear once again that the first sensor 4a cannot a priori be associated with a particular location on the vehicle 1. This is because the first sensor 4a is associated with a wheel 2a or with a tire 11. However, the wheel 2a or the tire 11 can be mounted at any location on the vehicle 1 for example when changing from summer tires to winter tires. This results in problems when the sensor 4a is also provided for monitoring tire pressure and a warning signal cannot be associated with a particular location on the vehicle 1, that is to say "front left", for example.

It quickly becomes clear from FIG. 4 that the phase angle W1a . . . W3a of the signal S4a remains within the tolerance range WTa for the signal S5a over the entire period presented in FIG. 4, whereas the tolerance range WTb for the second signal S5b is left as early as the second pickup operation. It is therefore clear that the wheel 2a with the first sensor 4a cannot possibly be mounted at the location on the vehicle 1 which is associated with the second sensor 5b, because otherwise the phase angle of the signal S4a would need to correlate to the signal S5b. In the example shown, the first sensor 4a can be rapidly associated with the second sensor 5a, and hence the wheel 2a can be rapidly associated with a particular location on the vehicle 1, namely front left.

The method according to the invention can, in principle, be performed individually for each first sensor 4a . . . 4d or it is possible for all the first sensors 4a . . . 4d to be associated at once.

The observation period is generally chosen such that the signals S4a . . . S4d can be explicitly associated with a particular second sensor 5a . . . 5d. Instead of a direct time statement, it is also possible to use the criterion that the revolutions or else wheel speeds of at least two wheels 2a . . . 2d exhibit a prescribable difference. In practice, cornering can be considered for this, for example, in which each wheel 2a . . . 2d follows its own circular path and hence there are different revolutions for each wheel 2a . . . 2d. However, spinning and locking wheels 2a . . . 2d can also bring about such a difference.

In other words, this means that the occurrence of a particular operating situation is awaited before the wheels 2a . . . 2d are associated with the positions on the vehicle 1.

When the vehicle is first fitted with tires or when new tires are purchased, or in the case of the biannual change cycles for summer and winter tires which are customary for passenger vehicles, a waiting time before the occurrence of such an operating situation is entirely acceptable, however. The occurrence of a prescribed operating situation is then the initiator or "trigger" for the positive performance of the fourth method step d).

It is naturally also conceivable to start the location method after the car has been parked for a relatively long period, that is to say after a time which, in principle, is sufficient to be able to change at least one tire on the vehicle. If the method is started after any relatively long parking period, it is possible to ensure that a change of tires is detected in all cases and the position of said tires ascertained. The occurrence of such a criterion would then be the initiator for the start of the method in step a). However, it is also conceivable—if not economical—for steps a) to c) to be performed continually and for the occurrence of a relatively long parking period to be the initiator for step d) of the method.

The invention claimed is:

1. A method of locating at least one wheel on a vehicle, the method which comprises:
    a) receiving, in a measurement system, a signal from a first sensor mounted on the wheel, the signal indicating an angular position for the wheel;
    b) receiving, in the measurement system, a measured value from a second sensor, measuring an angular position of a wheel and being associated with a particular location on the vehicle;
    c) determining, in the measurement system, a phase angle of the signal from the first sensor in relation to the measured value from the second sensor; and
    d) locating the wheel on the vehicle by associating the first sensor with the second sensor, in the measurement system, if the phase angle remains within a prescribed tolerance range within a given observation period.

2. The method according to claim 1, which comprises transmitting the signal with the first sensor in a predetermined position of the wheel.

3. The method according to claim 2, wherein the predetermined position provided for the wheel is one or more selected from the following group:
    an angular position of the wheel relative to space;
    an entry of a point on a wheel circumference into a wheel footprint;
    emergence of a point on the wheel circumference from the wheel footprint; and arrival of a point on the wheel circumference at a center of the wheel footprint.

4. The method according to claim 1, which comprises choosing the observation period such that the revolutions of at least two wheels exhibit a predetermined difference.

5. The method according to claim 1 which comprises determining the observation period by awaiting an occurrence of a particular operating situation for the vehicle.

6. A sensor assembly, comprising:
- a first sensor configured for mounting on a wheel or on a tire mounted on the wheel, said first sensor configured for transmitting a signal indicating an angular position of the wheel on a vehicle, and configured for measuring a further parameter of the wheel or of the tire; and
- a second sensor associated with a particular location on the vehicle, said second sensor configured to provide a signal indicating a profile of an angular progression of the wheel over a full revolution of the wheel on the vehicle.

7. The sensor assembly according to claim 6, wherein said first sensor is provided for transmitting the signal in a predetermined position of the wheel.

8. The sensor assembly according to claim 7, wherein the predetermined position of the wheel is one or more selected from the following group:
- an angular position of the wheel relative to space;
- an entry of a point on a wheel circumference into a wheel footprint;
- emergence of a point on the wheel circumference from the wheel footprint; and
- arrival of a point on the wheel circumference at a center of the wheel footprint.

9. The sensor assembly according to claim 6, wherein the further parameter is at least one parameter selected from the group consisting of a tire temperature and a tire pressure or a wheel load.

10. A detector for locating at least one wheel on a vehicle, comprising:
- a) a receiver for receiving a signal from a first sensor mounted on the wheel, the signal indicating an angular position of the wheel;
- b) a receiver for receiving a measured value from a second sensor measuring an angular position of a wheel and being associated with a particular location on the vehicle;
- c) means for determining a phase angle of the signal from the first sensor in relation to the measured value from the second sensor; and
- d) means for associating the first sensor with the second sensor if the phase angle remains within a prescribed tolerance range within a particular observation period.

11. The detector according to claim 10, wherein the observation period is chosen such that revolutions of at least two wheels exhibit a predetermined difference.

12. The detector according to claim 10, wherein the observation period is determined by awaiting the occurrence of a particular operating situation of the vehicle.

13. The detector according to claim 10, wherein means for determining the angular position in which the signal from the first sensor is received and said means for associating the first sensor with the second sensor are commonly integrated in a semiconductor chip, and wherein said receivers are at least one input of said chip and/or a radio reception module of said chip.

14. A system for locating at least one wheel on a vehicle, comprising:
- a detector, first sensors mounted on a wheel or on a tire on the wheel, and second sensors associated with a particular location on the vehicle;
- said first sensors transmitting a signal indicating an angular position of the wheel and measuring a further parameter of the wheel or of the tire;
- said detector including:
  - a) a receiver for receiving the position-indicating signals from said first sensors;
  - b) a receiver for receiving a measured value from said second sensor measuring an angular position of a wheel;
  - c) means for determining a phase angle of the signal from the first sensor in relation to the measured value from the second sensor; and
  - d) means for associating the first sensor with the second sensor if the phase angle remains within a prescribed tolerance range within a particular observation period.

* * * * *